April 7, 1970  D. F. WRIGHT  3,505,507
POWER-FACTOR MEASURING DEVICE
Filed Dec. 17, 1965
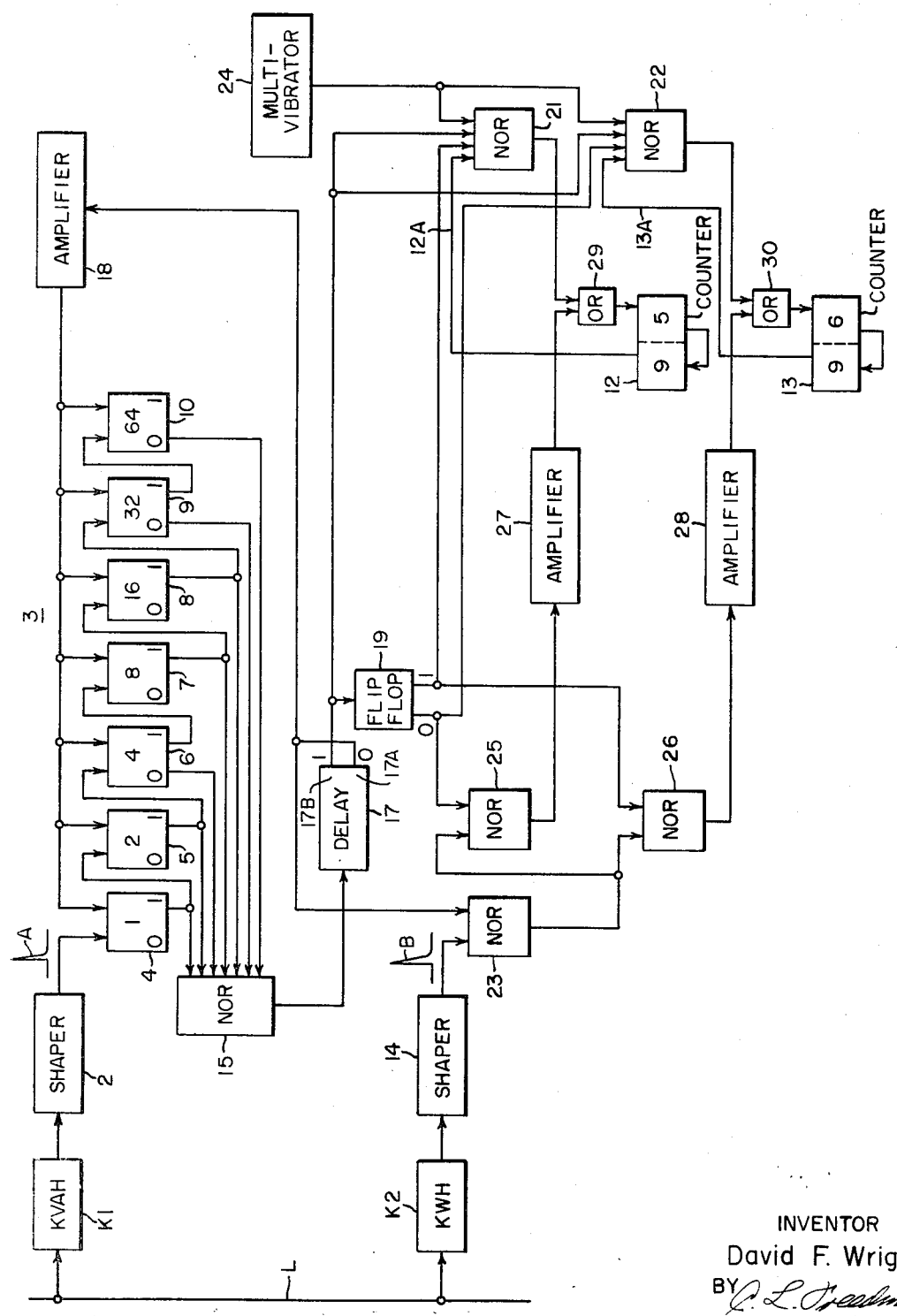
INVENTOR
David F. Wright
BY
ATTORNEY United States Patent Office 3,505,507
Patented Apr. 7, 1970

3,505,507
POWER-FACTOR MEASURING DEVICE
David F. Wright, Lake Park, Fla., assignor to Westinghouse Electric Corporation, Pittsburgh, Pa., a corporation of Pennsylvania
Filed Dec. 17, 1965, Ser. No. 514,489
Int. Cl. G06f 15/34
U.S. Cl. 235—151.31                    8 Claims

ABSTRACT OF THE DISCLOSURE

Pulses representng watt-hours are supplied alternately to first and second counters. Pulses representing volt-ampere-hours are supplied to a counting device. At the end of each cycle containing 100 volt-ampere-hour pulses, the non-counting counter is reset and placed in counting conditions, the count of the counting counter is retained and the counting device is reset. The retained count represents the power factor for the sast complete cycle.

---

This invention relates to devices for deriving information from pulse quantities and it has particular relation to pulse-operated power-factor devices.

In an alternating-current-power system, a number of quantities are of interest for various purposes such as monitoring system performance and determining charges for electrical energy. These quantities include real or active power and energy as represented by the kilowatt (KW) and kilowatt hour (KWH), reactive power and energy as represented by the reactive kilovolt ampere (KVAR) and reactive kilovolt ampere hour (KVARH), apparent power and energy as represented by the kilovolt ampere (KVA) and kilovolt ampere hour (KVAH), and power factor.

Apparatus has been developed for producing pulses at rates dependent on quantities such as KWH and KVAH. Each pulse represents a predetermined value of KWH or KVAH.

The present invention provides an arrangement for deriving from the pulses a registration of the average power factor during each interval measured. The power factor is represented by the ratio $KWH/KVAH$ which never exceeds unity. In a preferred embodiment of the invention, a KWH reading is taken for each block of KVAH. Desirably, this block represents 10 KVAH or some power of 10 KVAH. Since the numerator of any fraction having a power of 10 as its denominator has the same sequence of digits as the equivalent decimal number corresponding to the fraction, the KWH reading directly expresses the power factor in percent.

Each reading may be recorded by a printing operation. If desired, the readings may be made by two counters alternately, each counter being reset just before it starts a new count. In this way, a display of the last measured power factor is always presented.

One object of the invention is to provide an apparatus to be supplied from the outputs of a KWH and a KVAH pulse device to display and/or record the power factor at a desired point on an electric power system.

Another object is to provide an apparatus to be supplied as stated above which may approximate the power factor at any particular time at a point on an electric power system.

Another object is to provide apparatus which shall, when supplied from pulse-type registers of KWH and KVAH consumed at a point on an electric power system, compute the power factor for each successive block of 100 KVAH there consumed, and display or record such power factor for preceding blocks.

These and other objects of the invention will become apparent upon reading the following description taken in connection with the drawing, in which, the single figure is a schematic diagram of a circuit and apparatus in which the invention may be embodied.

Referring in detail to the drawing, pulse meters K1 and K2 produce pulses at rates dependent on KVA and KW respectively of an alternating current line operating at a frequency such as 60 cycles per second. Pulses A representative of the consumption of a definite number of KVAH at a customer's premises, passing if necessary through a suitable shaper 2, are supplied to a suitable counter 3 which may, as shown here, be of the solid-state digital type comprising flip-flop units 4 through 10 in series, respectively representing the well known rising powers of 2 which constitute the binary digits of a binary number. The number of units 4 through 10 here shown is proper to express the decimal number 100 which will correspond to reporting the power factor to the nearest percent, but if a greater precision than such report is desired enough flip-flops may be used to give a precision of 0.1 percent, for example; the number used being dependent, in accordance with well-known principles, upon the precision designed for. It is believed that such electronic counters, which are devoid of moving mechanism, are too well known to need more detailed description here. Other types of counters than the above are known and some one of these might be used, but the one here shown is considered to be preferable.

Each flip-flop, 4 through 10, has a pair of output terminals, one energized and the other not at any one time, which indicate whether the power of 2 represented by that flip-flop is a digit of a binary number being expressed. The energized terminal may be labeled 1 on the drawing and the unenergized terminal may be labeled 0. Thus, in expressing the decimal number 100, the "1" terminal of the flip-flop 10 would be energized to indicate the 6th power of 2 (i.e. 64); the "1" terminal of flip-flop 9 would be energized to indicate the 5th power of 2; and the 1 terminal of flip-flop 6 would be energized to indicate the second power of 2. The 0 terminals of all other flip-flops would be energized, and the binary number 1100100 representing 64+32+4, equaling 100 in decimal notation, would stand registered.

Registration of the KWH consumed at any time is produced by utilizing a pair of similar counters 12 and 13 which, for reasons about to be pointed out, are alternately switched into, and out of circuit. While counters 12 and 13 could be of the solid state digital type, it is desired to display their readings as decimal numbers, and so they are preferably of the electromechanical type. Such counters are widely sold on the market and are relatively cheap and satisfactory. Pulses B each indicative of a definite value of KWH arrive through a shaper 14 and pass, through gatings about to be described, to that one of the counters 12, 13 at that time standing switched into circuit.

In accordance with this invention, it is proposed to operate in successive cycles in each of which counter 3 counts 1000 KVAH and counter 12, let us say, registers and displays the number of KWH arriving in that cycle. On receiving 100 KVAH, counter 3 is reset to zero; counter 12 is switched out of operation, with its registration display undisturbed; and counter 13, is reset to zero, and then starts receiving the incoming KWH pulses. It is believed evident that, with this arrangement, one of the counters 12 and 13 will always display the average power factor for the operating cycle just finished, while the other counter is counting up to the power factor currently being registered.

The gating system by which the counters 12 and 13 are shifted into alternate operation for their respective cycles, and the counter 3 is reset to zero to initiate each cycle may be made up in the following way. NOR units or gates such as the unit 15, as well known in the present electronic art, are opaque to pulse passage as long as any one of their input leads is energized. As pointed out above, the flip-flops 10, 9 and 6 of counter 3 stand with their right-hand terminals energized and their left-hand output terminals deenergized, to indicate 64+32+4, i.e. the binary number 1100100, when 100 KVAH pulses have arrived through shaper 2. Similarly, the flip-flops 8, 7, 5 and 4 have their right-hand output terminals deenergized to indicate the zeros in that binary number. Thus, the NOR gate 15 will pass a pulse to delay unit 17 when, and only when, the binary number 1100100 (i.e. decimal number 100) KVAH pulses have arrived through shaper 2.

The delay unit 17 is of a known one-shot flip-flop type having two output terminals 17A and 17B. When the input of this unit is deenergized for a time longer than its time delay, the delay unit 17 is in a first condition providing a 1 output at its terminal 17B and an 0 output at its terminal 17A. When an input pulse reaches the delay unit 17 the unit switches to a second condition providing a 1 output at its terminal 17A and an 0 output at its terminal 17B. The unit remains in this second condition for a time sufficient to permit a resetting operation of either of the counters 12 or 13, and then returns to its first condition.

When the delay unit 17 switches to its second condition, the terminal 17A supplies an input to the NOR gate 23 which prevents the NOR unit from passing KWH pulses derived from the meter K2 for the duration of the time delay of the unit 17. In addition the terminal 17A supplies through the amplifier 18 an energization which resets the counter 3 and holds the counter in reset condition for the duration of the time delay. This terminates the input supplied to the delay unit 17 from the NOR gate 15.

In transferring to its second condition, the delay unit 17 also terminates the energization supplied from the terminal 17B to the NOR gates 21 and 22 and to the flip-flop 19. The NOR gates 21 and 22 control the coupling of a source of periodic pulses such as a multivibrator 24 to the counters 12 and 13 for the purpose of resetting the counters. When the NOR gate 21 is in blocking condition resetting pulses cannot be supplied by the multivibrator 24 to the counter 12. Similarly, when the NOR gate 22 is in blocking condition resetting pulses cannot be supplied by the multivibrator 24 to the counter 13. The resettting pulses pass respectively from the NOR gates 21 and 22 through OR gates 29 and 30 to the counters 12 and 13.

When the NOR gate 23 is in condition to transmit KWH pulses these pulses pass through one of two paths. The first path may be traced from the NOR gate 23 through a NOR gate 25, an amplifier 27 and the OR gate 29 to the counter 12 which counts the number of such pulses. The second path passes from the NOR gate 23 through a NOR gate 26, an amplifier 28 and the OR gate 30 to the counter 13 which counts the number of such pulses.

The two paths are placed alternately in effective condition by the flip-flop 19. When the flip-flop 19 is in a first condition it supplies energization to the NOR gates 21 and 26 for the purpose of blocking these gates. Consequently KWH pulses cannot be supplied to the counter 13 and reset pulses from the multivibrator 24 cannot be supplied to the counter 12. When the flip-flop 19 is in its second condition it supplies energization to the NOR gates 22 and 25 to block the supply of KWH pulses to the counter 12 and to block the supply of reset pulses from the multivibrator 24 to the counter 13.

In discussing the operation of the system it will be assumed initially that the counter 3 has just started a count of KVAH pulses, that the counter 13 has just completed a count of KWH pulses for a cycle or period corresponding to 100 KVAH pulses and is displaying the average power factor for such period and that the counter 12 has just started to count KWH pulses for a new cycle or period. Under these circumstances the outputs of the delay unit 17 and the flip-flop 19 are as marked in the drawing. The delay unit holds the NOR gates 21 and 22 in blocking condition and the flip-flop 19 holds the NOR gates 21 and 26 in blocking condition.

When a count of 100 KVAH pulses is reached by the counter 3 the seven inputs to the NOR gate 15 are all zero and the delay unit 17 is operated to its second condition. The terminal 17A of the delay unit 17 now supplies resetting energization through the amplifiers 18 to the counter 3. Inasmuch as the reset counter 3 no longer registers 100 the output of the NOR gate 15 promptly goes to 0. However, the delay unit remains in its second condition holding the counter 3 reset for the duration of the time delay of the delay unit 17.

The terminal 17A of the delay unit 17 also supplies energization blocking the NOR gate 23 for the duration of the time delay of the delay unit 17.

Inasmuch as the terminal 17B of the delay unit 17 goes to 0, it removes input energization from the flip-flop 19, but the flip-flop remains in its first condition. The inputs from the delay unit to the NOR gates 21 and 22 also drop to 0 for the duration of the time delay of the delay unit 17, but the NOR gate 21 continues to be blocked by energization supplied by the flip-flop 19.

Inasmuch as all inputs to the NOR gate 22 are now 0, resetting pulses are supplied therethrough from the multivibrator 24 to the OR gate 30 and ultimately to the counter 13. These resetting pulses rapidly reset the counter 13. When the counter reaches its reset condition it supplies energization over a lead 13A to the NOR gate 22 which again blocks the gate. A counter of this type which can be reset by pulses occurring at a rate of 60 cycles per second or even at a higher rate is well known in the art.

Shortly after the counter 13 has had sufficient time to reset, the delay unit 17 returns to its first condition. The terminal 17B now supples an energization blocking the NOR gates 21 and 22. Thus the counter 12 continues to display the average power factor for the recently completed cycle or period. The terminal 17B also supplies energization to the flip-flop 19 which flips to a second condition wherein it supplies an input to the NOR gate 25 to block KWH pulses from the counter 12 and wherein it removes its input to the NOR gate 26 to permit supply of KWH pulses to the counter 13. In addition, the flip-flop removes one of the inputs from the NOR gate 21 and supplies a blocking input to the NOR gate 22. The delay unit 17 also terminates its input from the terminal 17A to the NOR gate 23 and this NOR gate now passes KWH pulses through the NOR gate 26, the amplifier 28 and the OR gate 30 to the counter 13. The counter 13 starts to count KWH pulses for the new cycle or period while the counter 12 continues to display the average power factor for the preceding cycle.

Finally the return of the delay unit to its first condition terminates the resetting input to the counter 3 and this counter now starts to measure a new cycle of 100 KVAH pulses.

When another group of 100 KVAH pulses have been received by the counter 3 it again acts through the NOR gate 15 to supply an input to the delay unit 17. This delay unit 17 initiates the resetting of the counter 12 and the transfer of the KWH pulses to the counter 12 by a sequence which will be understood from the above discussion. During the counting cycle of the counter 12 the counter 13 continues to display the average power factor for the preceding cycle.

Each of the counters 12 and 13 may include provisions for printing its count at the end of each counting cycle. If a printed record is desired a single counter may be utilized to count the KWH pulses and to print the count at the end of each cycle of 100 KVAH pulses. However, the alternate counting arrangement of the drawing is desirable for presenting in convenient form the average power factor for the last full cycle.

I claim as my invention:

1. Apparatus for computing power factor of an electric system which comprises means to measure volt-ampere-hours and watt-hours and produce volt-ampere-hour pulses and watt-hour pulses at rates dependent on the volt-ampere-hours and watt-hours respectively of an alternating electric system, a first counter to count the volt-ampere-hour pulses, a second counter to simultaneously count the watt-hour pulses, and control means responsive to the volt-ampere-hour counter reaching an integral power of 10 for terminating the count of the watt-hour counter, whereby the terminated count represents power factor.

2. The invention as in claim 1 wherein the first counter comprises seven bistable circuit elements each having two output terminals which are alternately energized, the energized terminals of the elements respectively indicating the first seven powers of 2 and the unenergized terminals representing 0, each bistable circuit element also having a first input terminal and a reset terminal, the first input terminal upon receiving an energy pulse, causing its energized output terminal to be deenergized and its other output terminal to be energized, and the reset terminal, upon receiving an energizing pulse, causing the output terminals of the associated bistable element to indicate 0, whereby the application of a common pulse to the last-named input terminal of each of the bistable elements causes the first counter to indicate 0.

3. The invention as in claim 2 wherein the control means includes NOR gate means having plural input terminals and an output terminal which has an output when all of said plural input terminals have zero values and no output when any of said plural input terminals is energized, and wherein the output terminals of the bistable circuit elements which are deenergized when their bistable circuit elements represent 4, 32 and 64, and the output circuits of the other bistable circuit elements which are deenergized when their bistable circuit elements represent zero, are connected to the input terminals of the NOR gate, and means connecting the NOR gate means output to the reset terminals of all said bistable circuit elements and to means for controlling the second counter.

4. The invention as in claim 3 wherein a third counter is provided together with cycling means controlled by the output of said NOR gate means for connecting said second counter and said third counter alternatively to receive said watt-hour pulses.

5. The invention as in claim 4 wherein a local source of electric pulses is provided together with switching means for connecting the local source to the one of said second and third counters which is about to receive the watt-hour pulses for the purpose of resetting such counter to zero immediately prior to such reception of the watt-hour pulses.

6. The invention as claimed in claim 1 in combination with a third counter for counting the watt-hour pulses, said control means including transfer means responsive to each arrival of the count in the volt-ampere-hour counter at a predetermined integral power of 10 for transferring the counting of said watt-hour pulses from one to the other of said second and third counters.

7. The invention as claimed in claim 6 wherein said control means includes means responsive to each arrival of the count in the volt-ampere-hour counter at a predetermined integral power of 10 for resetting to zero the volt-ampere-hour counter and the one of the second and third counters to which the counting of the watt-hour pulses is to be transferred.

8. In combination with an alternating electric circuit, means to measure volt ampere hours and watt hours and produce volt ampere hour pulses and watt hour pulses at rates dependent on the volt ampere hours and watt hours respectively of the alternating electric circuit, and means to record the number of said watt hour pulses when the number of the volt ampere hour pulses reaches a predetermined integral power of 10.

References Cited

UNITED STATES PATENTS

| | | | |
|---|---|---|---|
| 2,874,900 | 2/1959 | Linderman | 324—140 |
| 2,672,284 | 3/1954 | Dickinson | 235—92 |
| 3,296,525 | 11/1967 | Sakuma | 235—92 |
| 3,360,723 | 12/1967 | Royce | 235—151.31 |
| 3,267,381 | 8/1966 | Thornberg | 328—48 X |
| 3,287,719 | 11/1966 | Thornberg | 328—48 X |

EUGENE G. BOLTZ, EXAMINER

U.S. Cl. X.R.

324—83, 140, 141